(12) United States Patent  
Olander

(10) Patent No.: US 8,833,247 B2
(45) Date of Patent: Sep. 16, 2014

(54) GIANT ROUND BALER COMPRESSOR

(75) Inventor: Brian D. Olander, Buhler, KS (US)

(73) Assignee: AGCO Corporation, Duluth, GA (US)

( * ) Notice: Subject to any disclaimer, the term of this patent is extended or adjusted under 35 U.S.C. 154(b) by 274 days.

(21) Appl. No.: 13/337,361

(22) Filed: Dec. 27, 2011

(65) Prior Publication Data

US 2012/0210888 A1 Aug. 23, 2012

Related U.S. Application Data

(60) Provisional application No. 61/427,266, filed on Dec. 27, 2010.

(51) Int. Cl.
A01F 15/07 (2006.01)
A01F 15/04 (2006.01)
B30B 9/30 (2006.01)
A01F 15/14 (2006.01)
A01F 15/00 (2006.01)

(52) U.S. Cl.
CPC .............. B30B 9/3007 (2013.01); A01F 15/07 (2013.01); B30B 9/3078 (2013.01); A01F 15/141 (2013.01); A01F 15/005 (2013.01)
USPC ................... 100/35; 100/87; 100/88; 56/341

(58) Field of Classification Search
CPC ..... A01F 15/141; A01F 15/005; A01F 15/07; B30B 9/3078; B30B 9/3007
USPC ............................ 100/35, 87, 88, 89; 56/341
See application file for complete search history.

(56) References Cited

U.S. PATENT DOCUMENTS

| 3,577,911 | A | * | 5/1971 | Morse | 100/347 |
| 4,062,172 | A | * | 12/1977 | Rice et al. | 56/343 |
| 4,579,052 | A | * | 4/1986 | Schaible | 100/5 |
| 4,805,528 | A | * | 2/1989 | Rogers et al. | 100/3 |
| 5,136,831 | A | * | 8/1992 | Fell et al. | 56/341 |
| 5,419,253 | A | * | 5/1995 | Campbell | 100/3 |
| 5,553,446 | A | * | 9/1996 | Sibley et al. | 56/341 |
| 7,111,547 | B1 | * | 9/2006 | Daniel | 100/3 |
| 7,331,279 | B2 | * | 2/2008 | Biziorek et al. | 100/48 |
| 7,472,649 | B1 | * | 1/2009 | Derscheid et al. | 100/88 |
| 2008/0271428 | A1 | * | 11/2008 | Rempe et al. | 56/341 |

* cited by examiner

Primary Examiner — Jimmt T Nguyen
Assistant Examiner — Onekki Jolly

(57) ABSTRACT

A round baler includes a bale-forming compartment having a bale forming system, the bale forming system configured to form a round bale. The round baler also has a compression system, and a bale-compressing compartment with a moveable wall operably coupled to the compression system. The compression system is configured to cause the moveable wall to compress a round bale that was formed in the bale-forming compartment. A gate is located between the bale-forming compartment and the bale-compressing compartment, the gate being moveable between an open position and a closed position.

20 Claims, 4 Drawing Sheets

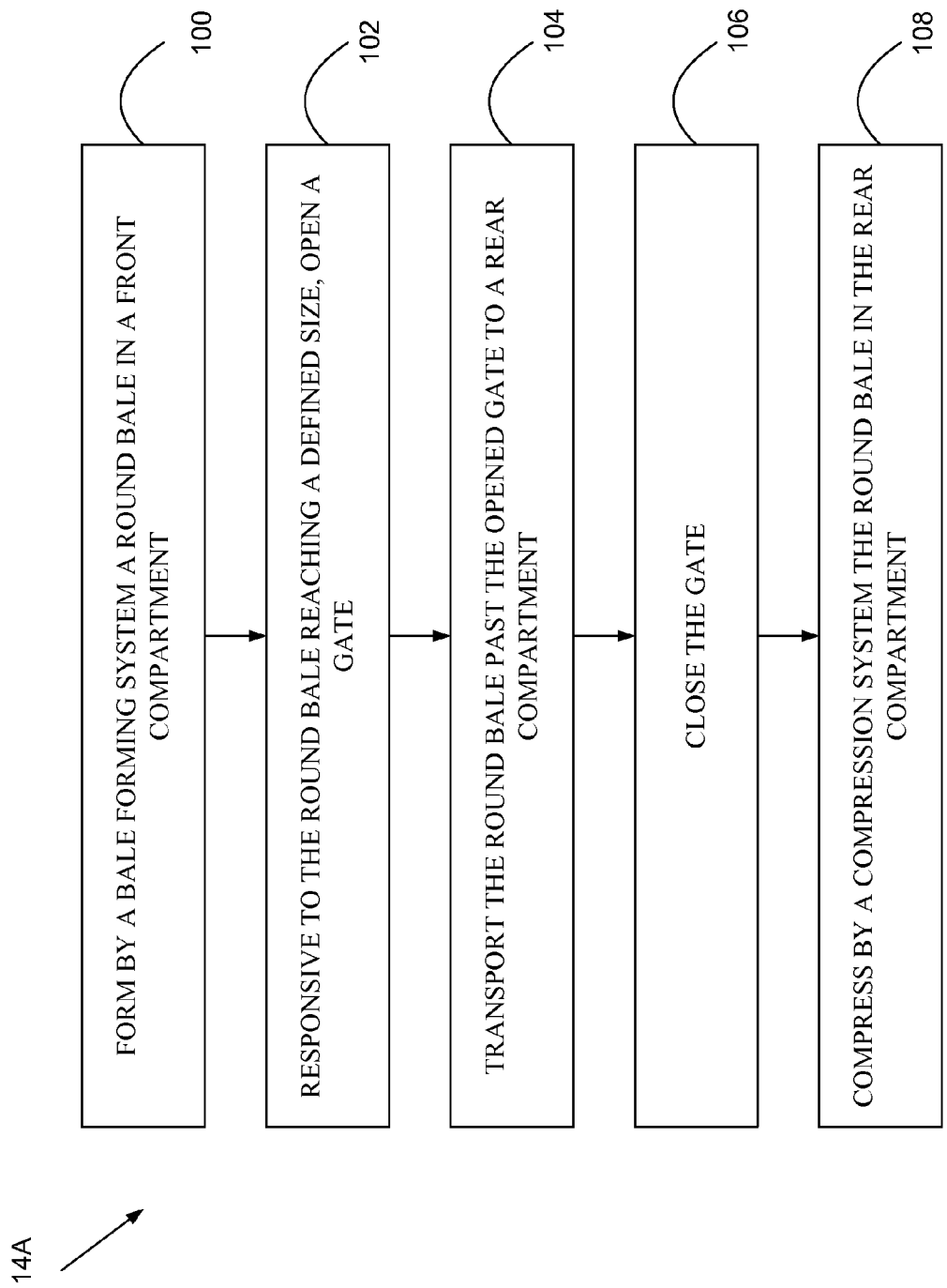

GIANT ROUND BALER COMPRESSOR

RELATED APPLICATION

Under provisions of 35 U.S.C. §119(e), Applicant claims the benefit of U.S. Provisional Application No. 61/427,266 filed Dec. 27, 2010, which is incorporated herein by reference.

TECHNICAL FIELD

The present disclosure generally relates to a round baler.

BACKGROUND

Baling operations can follow combine harvester operations or windrow operations. In the former instance, a baler may be towed by a combine harvester or by a tractor to gather cut crops such as plant stalks from a field to form the plant stalks into round or square bales. Biomass fuels such as straw, hay, or cereals may be formed into bales. In the latter instance, a baler may pick up windrows that were created by a mower-conditioner.

SUMMARY

In one embodiment, a round baler, comprising: a first compartment comprising a bale forming system, the bale forming system configured to form a round bale; a compression system; a second compartment comprising a moveable wall operably coupled to the compression system, the compression system configured to cause the moveable wall to compress a round bale formed in the first compartment; and a gate located between the first compartment and the second compartment, the gate moveable between an open position and a closed position.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3 is a flow diagram that illustrates an example round bale compressor method embodiment.

DETAILED DESCRIPTION

Figure 1:
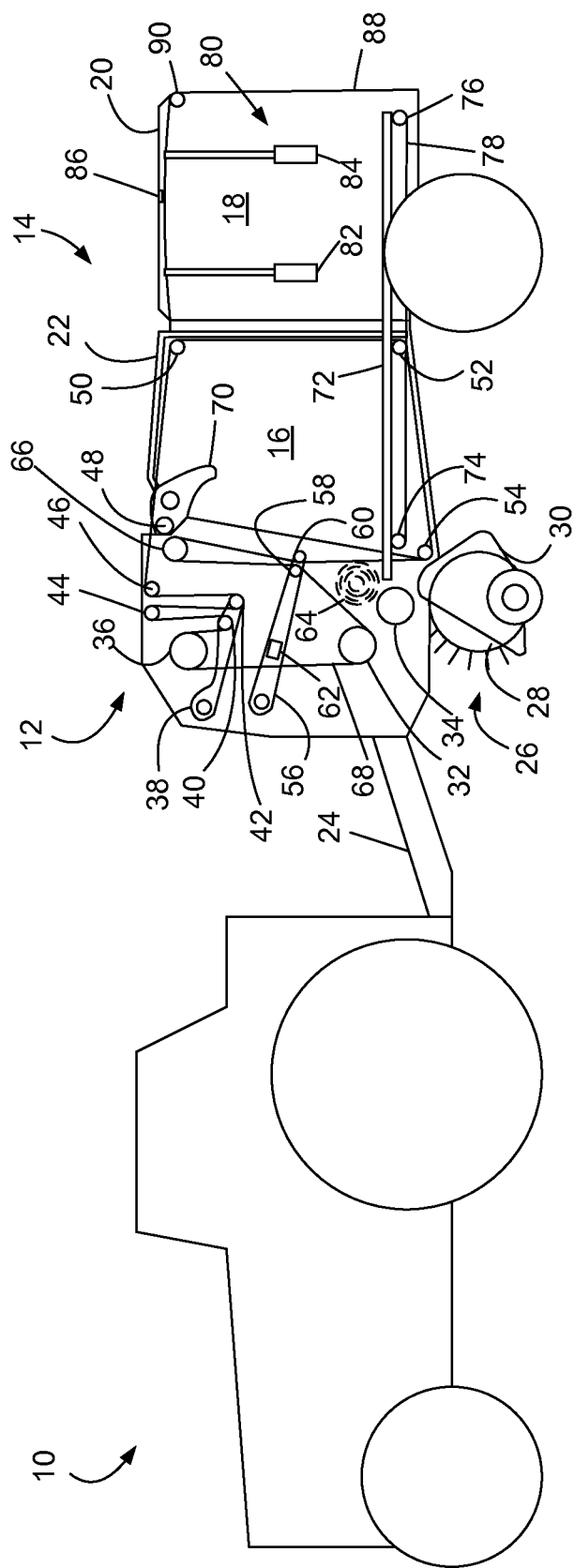
FIG. 1 is a schematic diagram that illustrates a tractor and an example round baler, shown in a partial cut-away, towed by the tractor, the round baler comprising an apparatus in which an embodiment of a round bale compressor system may be employed.

Certain embodiments of a round bale compressor system and associated method (collectively, referred to herein as a round bale compressor system) are disclosed. The round bale compressor system comprises a round bale forming compartment (chamber) and a compression compartment (chamber) separated by a retractable gate that, when open, allows the transport of a formed round bale to the compression compartment for compression of the round bale, and when closed, prevents such transport. The round bale compressor system efficiently and densely compacts large amounts of fiber mass embodied as a round bale (e.g., giant round bales, of say 8-10 feet (ft.) in diameter, 6-8 ft. in width, though round bales of larger or smaller sizes are contemplated to be within the scope of the disclosure).

The round bale compressor system is implemented in one embodiment as a continuous round baler type of machine that picks up windrowed or harvested crop material (e.g., crop residue, such as straw and/or other biomass material) from the ground (or from a transfer pan and/or conveying system in some embodiments) and forms the round bale. The round bale is formed in the round bale forming compartment, located at the front end of the baler, by rolling the collected crop repeatedly into a round bale of increasing dimensions as the baler travels along the ground. When the round bale has reached a defined size, a gate located between the round bale forming compartment and the compression compartment opens to allow the transfer or transport of the fully formed round bale from the round bale forming compartment to the compression compartment. Subsequently, the gate closes and the formed round bale now residing in the compression compartment is compressed. For instance, a motive force(s) coupled to one or more walls of the compression compartment causes the one or more walls of the compression compartment to press down (and/or laterally in some embodiments) on the fully formed round bale, creating additional density.

A subsequent operation, such as a strapping operation (e.g., via twine or mesh) is employed to confine the compressed shape (and maintain the high density of the compressed bale). A tailgate of the baler is ultimately opened, allowing the discharge of the final bale. The final bale, due to the compression, may be configured with an oval shape with the bottom having a relatively flatter appearance than the top of the finished bale, though other geometries are contemplated as a result of the compression process.

In contrast to embodiments of the round bale compressor system, conventional round balers lack a compression chamber and hence have a diminished density of the formed bale when compared to those discharged from the baler of the round bale compressor system. Further, given that the resultant compressed bale shares many features of a round bale, one or more of the benefits in terms of storage resulting from the use of round, versus square or rectangular, bales may also be realized in certain round bale compressor system embodiments.

The following detailed description refers to the accompanying drawings. Wherever possible, the same reference numbers are used in the drawings and the following description to refer to the same or similar elements. While certain embodiments of the disclosure may be described, modifications, adaptations, and other implementations are possible as should be understood by one having ordinary skill in the art in the context of the disclosure. For example, substitutions, additions, or modifications may be made to the elements illustrated in the drawings, and the methods described herein may be modified by substituting, reordering, or adding stages to the disclosed methods. References hereinafter made to certain directions, such as, for example, "front", "rear", "left" and "right", are made as viewed from the rear of the round baler looking forwardly.

Referring to FIG. 1, shown is an example tractor 10 towing a round baler 12, the round baler 12 housing certain embodiments of the round bale compressor system 14. It should be understood by one having ordinary skill in the art, in the context of the present disclosure, that the example components illustrated in FIG. 1 are merely illustrative, and should not be construed as implying any limitations upon the scope of the disclosure. For instance, in some implementations, the tractor 10 may be replaced with a combine harvestor, or the round baler 12 may be self-propelled in other implementations. The example round baler 12 is illustrated in FIG. 1 as having an expandable, round bale forming compartment 16 (chamber, also referred to hereinafter as merely compartment 16) defined by belts and rollers, and a compression compartment 18 (chamber, also referred to hereafter as merely a compartment 18) having one or more moveable walls, such as wall 20. The example round baler 12 also comprises a retractable gate 22 (also referred to herein as a midgate) located between the compartments 16 and 18. Though illustrated as having an expandable compartment 16, those having ordinary skill in the art should appreciate, within the context of the present disclosure, that certain embodiments of round bale compressor systems 14 may utilize a fixed chamber for the compartment 16.

The round baler 12 includes a front tongue 24 for connecting to the tractor 10 so that the round baler 12 may be towed through a field. The tongue 24 of the round baler 12 also connects to a power take off shaft of the tractor 10 to power the drive systems of the round baler 12, as should be understood by one having ordinary skill in the art. The round baler 12 has a pick-up assembly 26 including a pickup reel 28 and stuffer assembly 30 for moving the crop into the lower, front end of the compartment 16 in known manner.

Inside the compartment 16 is a lower drive roll 32 and a starting roll 34. Above the lower drive roll 32 is the upper drive roll 36. Pivotally mounted within the compartment 16 is a belt tension arm 38 to which is pivotally mounted the front belt tension roll 40 and the rear belt tension roll 42. At the top of the front portion of the compartment 16 is a front upper idler roll 44 and a rear upper idler roll 46. Following the interior of the compartment 16 around clockwise, there is a midgate belt roll 48, an upper rear midgate roll 50, a lower rear midgate roll 52, and a lower idler rolls 54. In some embodiments (e.g., variable chamber balers), a bale density arm 56 is pivotally mounted within the compartment 16 and has a front bale density roll 58 and a rear bale density roll 60, both pivotally mounted on the distal end from the pivotal mounting of the bale density arm 56. In some embodiments (e.g., fixed chamber balers), the bale density arm 56 and associated rolls 58 and 60 are omitted. The bale density arm 56 may further be coupled to (or integrated with) a sensor 62 that detects the angular position of the bale density arm 56 and sends signals to an electronic control system to indicate the size of a bale 64 during the bale formation cycle. In some embodiments, the sensor 62 may be located elsewhere within the compartment 16. Near the top of the compartment 16 above the bale density rolls 58 and 60 is depicted an upper bale chamber roll 66.

A plurality of bale forming belts 68 (one shown in profile) are threaded around each of the above identified rolls as depicted in FIG. 1. The bale forming belts 68 are tensioned by the front and rear belt tension rolls 40, 42, and the rolls 58, 60 mounted on the bale density arm 56. Other known components may be included, such as one or more rienks used to keep the forming belts clean, among others components, but are omitted for brevity. In addition to the elements described above, the round baler 12 also contains one or more drives, clutch assembly, and control electronics, none of which are shown in FIG. 1 but which are employed in the operation of the round baler 12 as should be understood by one of ordinary skill in the art.

Associated with the opening and closing movement of the gate 22 is a pivot mechanism 70 that, responsive to the bale 64 reaching a defined size (e.g., as indicated or triggered in one embodiment via signaling by the sensor 62), pivots upward and forward to open the gate 22 in cooperation with one or more of the midgate rolls to allow the formed round bale 64 residing in the compartment 16 to be transported to the compartment 18. The pivot mechanism 70 may be actuated hydraulically, electrically, or mechanically. In some embodiments, other mechanisms (e.g., aside from a pivot mechanism) for lifting or otherwise moving the gate to allow passage of the formed round bale 64 may be used, such as a motor and chain drive with rails, similar to a garage door opening assembly, or belt assembly, among others.

Transport of the formed round bale 64 may be achieved via a conveyor 72 (also referred to herein as a conveyor system) that, in one embodiment, spans along the bottom portion of each compartment 16 and 18 and in between, or in some embodiments, runs along a portion of the span (e.g., at the bottom of the compartment 16, where momentum or an additional motive force, such as a push bar, causes the formed round bale 64 to be deposited in the compartment 18). The conveyor 72 may comprise a chain or belt drive mechanism using rollers 74 and 76 and a belt 78 driven by the rollers 74, 76. The rollers 74, 76 may be driven hydraulically, electrically, or mechanically.

Once the formed round bale 64 is transported to the compartment 18, the gate 22 is closed. In one embodiment, a mechanical switch may be placed in the compartment 18 with its actuator protruding into the space defined by the compartment 18 (e.g., associated with one or more walls). When the bale 30 is received in the compartment 18, the actuator is depressed, signaling to the pivot mechanism 70 to close the gate 22. In some embodiments, the gate 22 may be closed by signaling to the pivot mechanism 70 by a load sensor (not shown) located in the suspension of the conveyor 72, the load sensor sensing the added load of the bale 64 in the compartment 18. In some embodiments, the gate 22 may be closed via signaling by a sensor located elsewhere (or in addition to the conveyor sensor) in the compartment 18, such as an infrared sensor detecting the presence of the newly arrived round bale 64. In some embodiments, the gate 22 may be closed after a programmed time delay. Other mechanisms for controlling the gate closure are contemplated to be within the scope of the disclosure, including closure based on the commencement of one or more operations in the compartments 16 and/or 18.

The compartment 18 comprises in some embodiments a portion of the conveyor 72 proximal to the bottom of the compartment and the moveable, top wall 20, as set forth previously. For instance, the top wall 20 may be moveable in the vertical direction along slots or tracks or rails in the vertical upstanding side walls and possibly rear wall of the compartment 18 (e.g., via a roller assembly), enabling movement in the vertical direction. Such slots/roller assemblies or rails or tracks may be further comprised of friction-type mechanisms that enable movement only via overcoming the friction of travel. In some embodiments, friction mechanisms may be omitted. As indicated above, other walls of the compartment (in addition to or in lieu of top wall 20) may be moveable (e.g., actuable, such as via a hydraulic, mechanical, or electrical actuator). Further, the compartment 18 comprises a compression system 80. In one embodiment, the compression system 80 comprises cylinders 82 and 84. The cylinders 82 and 84 each comprise a body and piston and rod assembly, actuated through hydraulic fluid or air (hoses not shown), such as provisioned by a drive system of the round baler 12 and sourced from the PTO of the towing vehicle. The body of each cylinder 82 and 84 may be fixably attached to a frame member of the round baler 12 or one of the walls of the compartment 18, and the piston and rod assembly of the cylinders 82 and 84 may be coupled to the top wall 20 (e.g., bolted or welded to the top wall 20 or to a member fixed to the top wall 20). Upon actuation of the cylinders 82 and 84, the cylinders 82 and 84 pull the wall 20 downward along slots in the upstanding rear and sidewalls of the compartment 18 and against the bale 64 residing in the compartment 18 (not shown in the compartment 18 in FIG. 1), causing compression of the bale 64 from a round configuration to a more oval or hybrid top oval plus rounded rectangular bottom configuration. In some embodiments, the cylinders 82, 84 or other compression mechanisms may be used on a top-side surface of the wall 20, achieving compression via a push-type mechanism rather than a pull-type mechanism as illustrated in FIG. 1. In some embodiments, compression may be achieved through movement of additional or different walls of the compartment 18, such as "squeezing" the walls in addition to or in lieu of the illustrated mechanism.

The compression system 80 may be coupled to sensors that detect the amount of compression and/or size of the compressed bale and signal to the compression system 80 to cease compression operations. In one embodiment, one or more sensors (one shown) may be coupled to, or integrated with, the wall 20, as shown by sensor 86. In some embodiments, sensors may be located on the conveyor 72, and/or coupled to or integrated with the cylinders 82, 84, among other locales within the compartment 18.

Responsive to cessation of compression operations, a tailgate 88 pivotable about pivot mechanism 90 (e.g., a roller, latch assembly, hinge assembly, etc.) may open (e.g., upwards, though in some embodiments, other directions of opening may be utilized), enabling the compressed bale to be discharged from the rear of the round baler 12. The tailgate 88 may close immediately, after a defined delay after the discharge, or responsive to sensing the bale rearward advancement past (e.g., the front of the bale, or the rear of the bale plus a timed delay) the plane of the tailgate 88. In some embodiments, the compressed bale may be transported past the location where the bale 64 is compressed in the compartment 18 and toward the rear of the round baler 12 by the conveyor 72. For instance, the conveyor 72 may stop rearward transport of the bale 64 at a first point along a longitudinal direction of the compartment 18, such as where the round bale 64 is suitably located (e.g., centered) beneath the wall 20 for the compression operation. Subsequent to compression, the conveyor 72 may re-commence rearward movement to a second point closer to the tailgate 88. In some embodiments, the round baler 12 may comprise a bale kicker assembly (not shown) associated with the tailgate 88. The bale kicker assembly is a known component that includes a bale push bar and one or more hydraulic cylinders (not shown). As the tailgate 88 rises, hydraulic pressure is applied to the base end of the kicker hydraulic cylinders. The bale push bar rises upward and rearward pushing the bale away from the tailgate 88 as the tailgate closes. After the tailgate is closed the kicker is returned to its home position. Note that the bale kicker assembly may engage the compressed bale at the point of compression in the compartment 18, or in some embodiments, past the point of compression as advanced rearwardly by the conveyor 72.

In some embodiments, discharge of the compressed bale from the rear of the round baler 12 may be based on operator input. For instance, the tailgate 88 may not be opened until signaling by a controller responsive to operator selection of buttons or switches or other user interfaces at an operator console, such as to enable discharge of the compressed bale at a convenient time and/or place.

It should be appreciated that the round bale compressor system 14 may comprise the compartments 16 and 18, the gate 22, and associated controls (e.g., actuators, etc.). In some embodiments, the round bale compressor system 14 may additionally comprise the bale forming apparatus (e.g., rollers, belts, clutches, etc.) and compression system 80. In some embodiments, the round bale compressor system 14 may comprise the entirety of the round baler 12, or in some embodiments, a portion thereof.

Figure 2A:
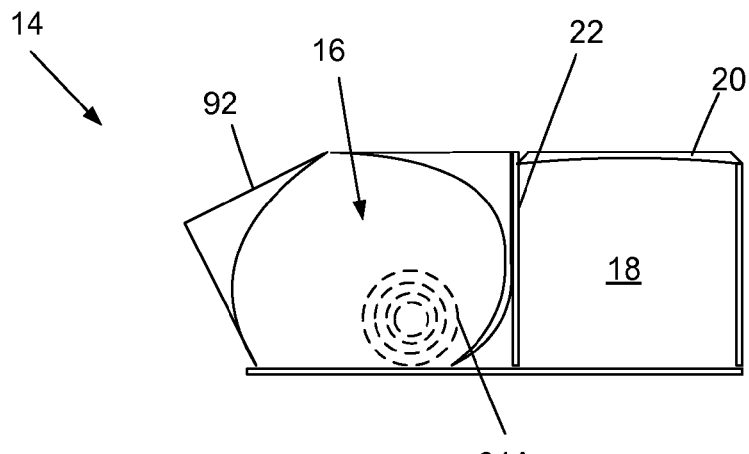
FIGS. 2A-2F are block diagrams that illustrate a round bale forming and compression operation implemented by an embodiment of a round bale compressor system.
Figure 2B:
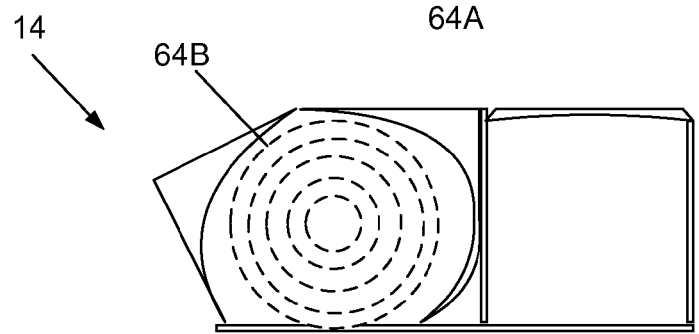

Having described an example round baler 12 in which one or more embodiments of a round bale compressor system 14 may be employed, attention is directed to FIGS. 2A-2F, which diagrammatically illustrate stages of operation of an example embodiment of a round bale compressor system 14. It should be appreciated that certain components described in association with FIG. 1 are omitted to facilitate an understanding of operations of one or more embodiments of a round bale compressor system 14. Referring to FIG. 2A, shown is the example round bale compressor system 14, including a frame portion 92 of the front of the round baler 12, the compartments 16 and 18, the gate 22, and the wall 20. FIG. 2A illustrates the formation of the round bale 64A in its initial stage of formation using the bale forming mechanisms described in association with FIG. 1. Referring to FIG. 2B, the bale 64B represents the increased size of the round bale 64B as the round baler 12 progresses along the surface and picks up the crop material (or the crop material is passed via a transfer pan from the towing vehicle) and the belts 56 and other bale forming mechanisms cause the formation of the round bale 64B.

Figure 2C:
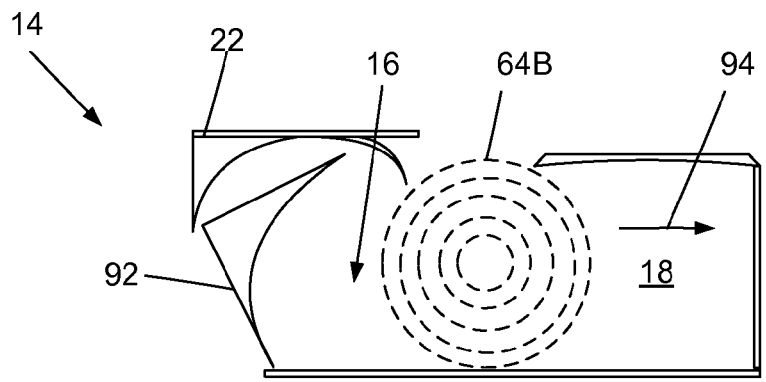

Referring to FIG. 2C, the gate 22 is shown actuated to a full-open position (and relative to the fixed frame member 92) to allow the rearward transport 94 of the round bale 64B from the compartment 16 to the compartment 18. As explained previously, the rearward transport 94 may be achieved via movement of a belt, chain, etc. of a conveyor 72, though in some embodiments, an urging mechanism, similar to a small-scale bale push bar, may be used with or in lieu of the conveyor 72.

Figure 2D:
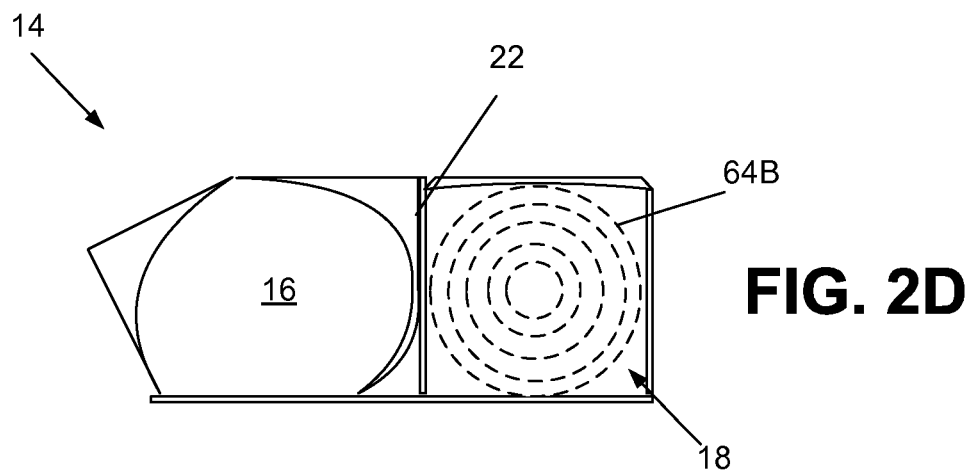
Figure 2E:
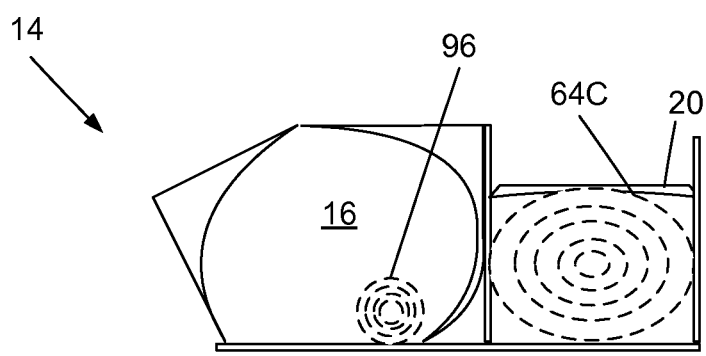

In FIG. 2D, the gate 22 is actuated to the closed position, and the fully-formed round bale 64B now resides in the compartment 18. Commencement of the compression operations may begin, as well as the commencement of the bale forming operations in compartment 16, as illustrated in FIG. 2E. In particular (e.g., FIG. 2E), the wall 20 is actuated (e.g., via the compression system 80) downward, pressing against the round bale 64B to form an oval-like shape of the bale, the compressed bale designated as bale 64C. Concurrently (at least in part) with the compression of the bale 64B to form bale 64C, newly received crop material is formed into a new round bale 96. Although the compression and bale forming operations are illustrated as commencing once the gate 22 is closed (or proximal in time to closure), in some embodiments, the gate 22 need not be fully closed to commence the bale forming and/or compression operations.

Figure 2F:
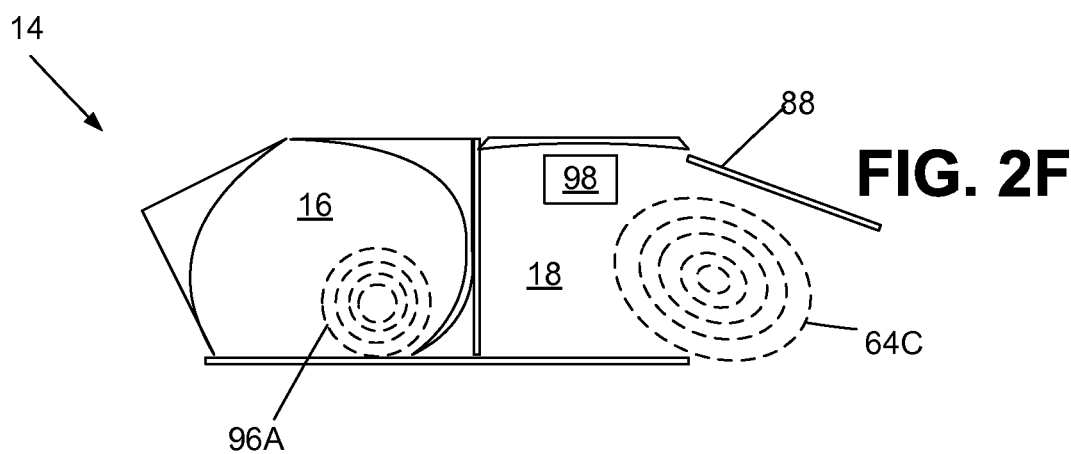

Referring to FIG. 2F, shown is the opening of the tailgate 88 and release of the compressed bale 64C from the compartment 18, along with the continued increase in size of the round bale 96A due to bale forming operations implemented in the compartment 16. Note that the compressed bale 64C may undergo further operations prior to, or contemporaneous with, the opening of the tailgate 88, such as strapping operations implemented by a strapping system 98 (shown generically in block diagram form). In some embodiments, the strapping system 98 may be embodied as a twine knotter similar to those used on a big square baler. In some embodiments, the strapping system 98 may be embodied as a flat strapping system similar in at least some respects to those used in shipping applications. Other mechanisms may be used in some embodiments. In operation, and while under pressure by actuation of the wall 20 (or in some embodiments, a defined amount of time subsequent to the compression, such as immediately afterwards), the strapping system 98 may wrap the compressed bale 64C with twine, mesh, etc.

Having described certain embodiments of the round bale compressor system 14, it should be appreciated, in the context of the present disclosure, that one embodiment of a round bale compressor method 14B, illustrated in FIG. 3, comprises forming by a bale forming system (e.g., the bale forming components described in association with compartment 16 and FIG. 1) a round bale in a front compartment (100); responsive to the round bale reaching a defined size, opening a gate (102); transporting the round bale past the opened gate to a rear compartment (104); closing the gate (106); and compressing by a compression system the round bale in the rear compartment (108).

It should be emphasized that the above-described embodiments of the present disclosure are merely possible examples of implementations, merely set forth for a clear understanding of the principles of the round bale compressor embodiments. Many variations and modifications may be made to the above-described embodiment(s) without departing substantially from the spirit and principles of the disclosure. Although all such modifications and variations are intended to be included herein within the scope of this disclosure and protected by the following claims, the following claims are not necessarily limited to the particular embodiments set out in the description.

What is claimed is:

1. A round baler, comprising:
a first bale-forming compartment comprising a bale forming system with at least one bale-forming belt, configured to form a round bale in the first bale-forming compartment;
a compression system;
a second bale-compressing compartment separate from but adjacent to the first bale-forming compartment and comprising a moveable wall operably coupled to the compression system, the compression system configured to cause the moveable wall to compress a round bale which was formed in the first bale-forming compartment, and the second bale-compressing compartment further comprising a tailgate for releasing the compressed round bale from the second bale-compressing compartment;
a bale transport system configured to transport the formed round bale from the first bale-forming compartment to the second bale-compressing compartment;
a gate located between the first bale-forming compartment and the second bale-compressing compartment, the gate moveable between an open position and a closed position to permit movement of formed bales from the first bale-forming compartment to the second bale-compressing compartment; and
a mechanism coupled to the gate configured to cause the gate to open, the mechanism responsive to round bales in the first compartment reaching a defined size.

2. The round baler of claim 1, wherein the gate is pivotable between the open and closed positions.

3. The round baler of claim 1, wherein the bale forming system is configured to form a first round bale in the first compartment at least in part concurrently with the compression of a second round bale in the second compartment caused by the compression system.

4. The round baler of claim 1, wherein the tailgate is moveable between an open position and a closed position.

5. The round baler of claim 4, wherein the tailgate is moveable to the open position after compression of the round bale in the second compartment caused by the compression system.

6. The round baler of claim 1, wherein the bale transport system comprises a conveyor system, the conveyor system configured to transport the round bale formed in the first compartment to the second compartment responsive to the gate positioned in the open position.

7. The round baler of claim 1, further comprising a strapping system located proximally to the second compartment, the strapping system configured to wrap the round bale compressed in the second compartment with a material that confines the compressed bale.

8. The round baler of claim 1, wherein the mechanism coupled to the gate comprises a pivot mechanism coupled to the gate, the pivot mechanism configured to cause the gate to open responsive to the round bale in the first compartment reaching a defined size.

9. The round baler of claim 8, further comprising a sensor coupled to the pivot mechanism, the sensor configured to detect the size of the round bale formed in the first compartment.

10. A round baler, comprising:
a first bale-forming compartment comprising a bale forming system with at least one bale-forming belt, the bale forming system configured to form a first round bale in the first bale-forming compartment;
a compression system;
a second bale-compressing compartment adjacent the first bale-forming compartment and comprising a moveable wall, the moveable wall operably coupled to the compression system, the compression system configured to cause the moveable wall to compress a second round bale in the second bale-compressing compartment at a time substantially concurrent with the formation of the first round bale in the first bale-forming compartment, the second round bale previously formed in the first bale-forming compartment and subsequently moved into the second bale-compressing compartment for compression, and the second bale-compressing compartment further comprising a tailgate for releasing the compressed round bale from the second bale-compressing compartment;
a gate located between the first bale-forming compartment and the second bale-compressing compartment, the gate pivotable between an open position and a closed position;
a bale transport system configured to transport the formed round bales from the first bale-forming compartment to the second bale-compressing compartment.

11. The round baler of claim 10, wherein the bale transport system comprises a conveyor system, responsive to the gate pivoting from the closed position to the open position, the conveyor system being configured to transport the formed first round bale from the first compartment to the second compartment.

12. The round baler of claim 10, further comprising a pivot mechanism operably coupled to the tailgate, the pivot mechanism configured to move the tailgate from a closed position to an open position to allow the discharge of the compressed second round bale, the pivot mechanism configured to open the tailgate subsequent to completion of the compression of the second round bale.

13. The round baler of claim 10, wherein the compression system is configured to cause the moveable wall to press downward on the second round bale to cause compression.

14. The round baler of claim 10, further comprising a pivot mechanism coupled to the gate, the pivot mechanism configured to cause the gate to open responsive to the round bale in the first compartment reaching a defined size.

15. A round bale compressing method using a round baler comprising a front bale-forming compartment including a bale forming system with at least one bale-forming belt configured to form a round bale, a compression system, a rear bale-compressing compartment separate from but adjacent to the front bale-forming compartment and comprising a moveable wall operably coupled to the compression system, a tailgate for releasing the compressed round bale from the rear bale-compressing compartment, a bale transport system configured to transport the formed round bale from the front bale-forming compartment to the rear bale-compressing compartment, a gate located between the front bale-forming compartment and the rear bale-compressing compartment, the gate moveable between an open position and a closed position to permit movement of formed bales from the front bale-forming compartment to the rear bale-compressing compartment, and a mechanism coupled to the gate configured to cause the gate to open, the mechanism responsive to round bales in the front bale-forming compartment reaching a defined size the method comprising the steps of:

forming by the bale forming system a round bale in the front bale-forming compartment;

responsive to the round bale reaching a defined size, opening the gate;

transporting the round bale past the opened gated to the rear bale-compressing compartment;

closing the gate; and compressing by the compression system the round bale in the rear bale-compressing compartment.

16. The method of claim 15, further comprising, while compressing the round bale, forming a second round bale in the front bale-forming compartment.

17. The method of claim 15, further comprising opening the tailgate at a defined time subsequent to completion of the compressing of the round bale.

18. The method of claim 15, wherein the compressing comprises causing the wall of the rear bale-compressing compartment to press against the round bale in the rear bale-compressing compartment.

19. The method of claim 15, wherein the transporting comprises moving the round bale along a conveyor between the front bale-forming compartment and the rear bale-compressing compartment.

20. The round baler of claim 1, wherein the compression system moves the wall in a substantially vertical direction to flatten the round bale in the second bale-compressing compartment.

* * * * *